United States Patent
Haimerl et al.

(10) Patent No.: US 7,144,110 B2
(45) Date of Patent: Dec. 5, 2006

(54) DOUBLE PROGRESSIVE SPECTACLE LENS

(75) Inventors: Walter Haimerl, Munich (DE); Helmut Altheimer, Baisweil-Lauchdorf (DE); Gregor Esser, Munich (DE); Edda Wehner, Emmering (DE); Andrea Welk, Munich (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 11/128,304

(22) Filed: May 13, 2005

(65) Prior Publication Data

US 2006/0007393 A1    Jan. 12, 2006

Related U.S. Application Data

(63) Continuation of application No. PCT/EP03/12521, filed on Nov. 10, 2003.

(30) Foreign Application Priority Data

Nov. 13, 2002 (DE) ................................ 102 52 814

(51) Int. Cl.
*G02C 7/06* (2006.01)
(52) U.S. Cl. ..................... 351/169; 351/177
(58) Field of Classification Search ............... 351/169
See application file for complete search history.

(56) References Cited

U.S. PATENT DOCUMENTS

| | | | |
|---|---|---|---|
| 6,074,061 A | 6/2000 | Miura | |
| 6,123,422 A | 9/2000 | Menezes et al. | |
| 6,231,184 B1 * | 5/2001 | Menezes et al. | 351/169 |
| 2004/0080711 A1 * | 4/2004 | Menezes | 351/169 |
| 2005/0068493 A1 * | 3/2005 | Menezes | 351/168 |

FOREIGN PATENT DOCUMENTS

| | | |
|---|---|---|
| DE | 103 31 300 A1 | 2/2004 |
| EP | 0 724 179 A2 | 7/1996 |
| WO | WO 02/061496 A2 | 8/2002 |

* cited by examiner

*Primary Examiner*—Jordan M. Schwartz
(74) *Attorney, Agent, or Firm*—Crowell & Moring LLP

(57) ABSTRACT

A double progressive spectacle lens having a prefabricated progressive surface and a second progressive surface for correcting a spherical ametropia or a cylindrical ametropia, in which the surface properties of the progressive surface in the vicinity of the principal line of sight are asymmetric, the asymmetry being determined by the symmetry factor $S_A$, which is determined in relation to the level A by the ratio of the smaller to the larger horizontal distance between the principal line of sight and the location at which the surface astigmatism in the horizontal section reaches the value A [dpt].

18 Claims, 5 Drawing Sheets

DOUBLE PROGRESSIVE SPECTACLE LENS

CROSS REFERENCE TO RELATED APPLICATIONS

This application is a continuation of international patent application no. PCT/EP2003/012521, filed Nov. 10, 2003, designating the United States of America, and published in German as WO 2004/044642 A1 on May 27, 2004, the entire disclosure of which is incorporated herein by reference. Priority is claimed based on Federal Republic of Germany patent application no. DE 102 52 814.4, filed Nov. 13, 2002.

BACKGROUND OF THE INVENTION

The invention relates to a double progressive spectacle lens having a prefabricated progressive surface and a second progressive surface for correcting a spherical ametropia or a cylindrical ametropia.

Conventional spectacle lenses are known from the prior art. They are distinguished in that there is a limited number of progressive surfaces, so-called base curves, with the aid of which the complete active zone consisting of sphere, cylinder, axis and addition is covered. The adaptation to the individual action is then accomplished by a prescription surface that is spherical or aspheric, toric or atoric. This has the disadvantage that such a progressive lens has optimum properties only for the middle of the base curve and this also holds, in particular, for the addition. If an individually atoric surface is applied to the rear side, it is also possible to improve the properties outside the central zones of the prior art.

Also known from the prior art are progressive lenses from Rodenstock, which have been produced by means of the so-called individual lens technology (ILT), that is to say by taking account of customer-specific parameters such as pupil distance, corneal vertex distance, frame forward tilt and frame disc angle. Reference is made in this regard to U.S. Pat. No. 6,848,788 (=WO 01/81985); US 2004/017543 (=WO 01/81981); U.S. Pat. No. 6,669,337 (=WO 01/81982) and U.S. Pat. No. 6,832,834 (=WO 01/81979), for example.

Asymmetric surfaces are described in U.S. Pat. No. 6,074,061 of Tokai and also outlined as prior art, although the iso-astigmatic lines in the progression channel and in the near zone run virtually parallel to the principal lime. Also, the astigmatism in the position of use has a similar structure to surface astigmatism.

U.S. Pat. No. 6,213,603 (=WO 98/01787) describes a progressive spectacle lens in which the magnitude of the surface astigmatism of at least one of the surfaces contributing to a change in power has, along at least one section of the spectacle lens with a horizontal plane, a local maximum that is at a distance of not more than 4 mm from the principal lime and at least one local minimum that does not lie on the principal lime and whose distance from the principal lime is greater than that of the local maximum.

The documents cited here as background information refer to single progressive spectacle lenses.

SUMMARY OF THE INVENTION

It is an object of the present invention to provide an improved double progressive spectacle lens.

Another object of the invention is to provide a double progressive spectacle lens which has a prefabricated progressive surface and a second progressive surface for correcting a spherical ametropia or a cylindrical ametropia which have optimum properties for each action.

These and other objects are achieved in accordance with the present invention by providing a double progressive spectacle lens having a prefabricated progressive surface and a second progressive surface for correcting a spherical ametropia or a cylindrical ametropia, wherein the surface properties of the progressive surface in the vicinity of the principal line of sight are asymmetric; the asymmetry is determined by the symmetry factor $S_A$, and the symmetry factor $S_A$ is determined in relation to the level A by the ratio of the smaller to the larger horizontal distance between the principal line of sight and the location at which the surface astigmatism in the horizontal section reaches the value A [dpt].

Thus, in accordance with the present invention, the surface properties of the progressive surface in the vicinity of the principal line of sight are asymmetric, the asymmetry being determined by the symmetry factor $S_A$, which is determined in relation to the level A by the ratio of the smaller to the larger horizontal distance between the principal line of sight and the location at which the surface astigmatism in the horizontal section reaches the value A [dpt].

Therefore, a second progressive surface is optimized in addition to a prefabricated progressive surface, it being possible to arrange the second progressive surface on the front or on the rear surface, depending on the position of the prefabricated progressive surface. This second progressive surface is distinguished by a high level of asymmetry of the surface properties in the vicinity of the principal line of sight. This aforementioned property is indispensable in order to achieve continuously optimum imaging properties. It is thereby also possible to set the addition correctly for all combinations of action.

A further object of the present invention is to provide a method for producing a double progressive spectacle lens. This object is achieved by providing a method comprising the steps of:

selecting a fabricated progressive surface from an existing base curve system, calculating a second progressive surface having the properties described in claims 1–14, and fabricating the double progressive spectacle lens.

The principal line of sight or design line is optimally adapted to the principal line of sight for the middle of the base curve in the progression zone. With older lenses, the principal line is a plane curve, while with modern progressive lenses it is a curve which curves in three dimensions and for which the inset depends on the base curve and on the addition of the surface.

If a prefabricated progressive surface that can be both a front and a rear surface and is designed for 1 dpt addition is used for a double progressive lens with 2 dpt addition, the course of the principal line on the progressive surface differs from the course of resulting principal line of sight. It is of no consequence here whether the already existing progressive surface has a plane or curved principal line.

At the prefabricated surface, the principal line of sight penetrates zones where the surface astigmatism is not minimum. It is therefore necessary to introduce a surface astigmatism on the second progressive surface to the effect that it exactly compensates that of the prefabricated progressive surface in terms of magnitude and direction. Once the double progressive lens is centered using the centering cross of the original surface, the said zone is located in the lower progression zone or in the near zone. With different centering, it can also migrate upward as far as into the distant zone.

Furthermore, it is necessary to take note of the gradient of the surface astigmatism of the prefabricated progressive surface at the principal line of sight, which can sometimes assume substantial values. It must therefore be compensated by the second progressive surface in order to ensure imaging properties that are approximately horizontal and symmetrical. The result of this is a characteristic surface shape that generally exhibits pronounced asymmetry at least in the lower half of the progression channel, and this is generally lacking in surfaces of single progressive spectacle lenses. Furthermore, it is extremely advantageous for the additionally optimized surface to have a curved principal line. The asymmetry described can be characterized by the following parameters:

$dxL_A$ is the horizontal distance between the location to the left (on the nasal side) of the principal line of sight at which the surface astigmatism reaches the value A, and $dxR_A$ is the horizontal distance between the location on the right (on the temporal side) of the principal line of sight at which the surface astigmatism reaches the value A.

$dxMax_A$ is the larger of the two distances, and $dxMin_A$ is the smaller of the two distances:

$dxMax_A = max(dxL_A, dxR_A)$ and $dxMin_A = min(dxL_A, dxR_A)$.

The quotient or symmetry factor $$S_A = dxMin_A/dxMax_A$$

is then a measure of the symmetry or asymmetry of the profile of astigmatism of a surface. The larger the deviation of the symmetry factor from 1, the more asymmetric the surface. A symmetrical surface would have a symmetry factor of 1.0 at all levels.

It is preferred that the symmetry factor $S_{0.3}$ of the progressive surface is less than 0.8 in at least one horizontal section, and that for the purpose of correcting an astigmatism of the eye with an axial position of 0°±5° or 90°±5° the symmetry factor $S_{0.3}$ of the progressive surface is smaller than 0.8 in at least one horizontal section.

Furthermore, the symmetry factor $S_{0.2}$ of the progressive surface should be smaller than 0.7 in at least one horizontal section, and in particular smaller than 0.5.

The surface astigmatism in the horizontal section should pass through a minimum in the case of the progressive surface in a region of 2 mm to the right and left of the principal line of sight, it being preferred that the surface astigmatism in the horizontal section pass through a minimum in the case of the progressive surface in a region of 1 mm to the right and left of the principal line of sight.

Furthermore, the surface astigmatism in the horizontal section can pass through a further minimum, differing from the first one, in the case of the progressive surface in a region of 6 mm to the right and left of the principal line of sight.

The aforementioned properties of the progressive surface should be present between y=+30 mm and −30 mm and it is preferred when the said properties of the progressive surface are present between y=+20 mm and −20 mm.

The second progressive surface can be both the rear side and the front side of the double progressive spectacle lens.

Furthermore, the horizontal component of the gradient of the surface astigmatism of the progressive surface has a value at the principal line of sight which differs from zero.

The double progressive spectacle lens is distinguished, furthermore, in that the surface power $D=0.5*(n-n') (1/r_1 + 1/r_2)$ decreases from top to bottom along the principal line of sight.

BRIEF DESCRIPTION OF THE DRAWINGS

The invention will be described in further detail hereinafter with reference to illustrative preferred embodiments depicted in the accompanying drawing figures, which are included by way of example and are not intended to limit the scope of the invention. In the drawings.

DETAILED DESCRIPTION OF PREFERRED EMBODIMENTS

Figure 1:
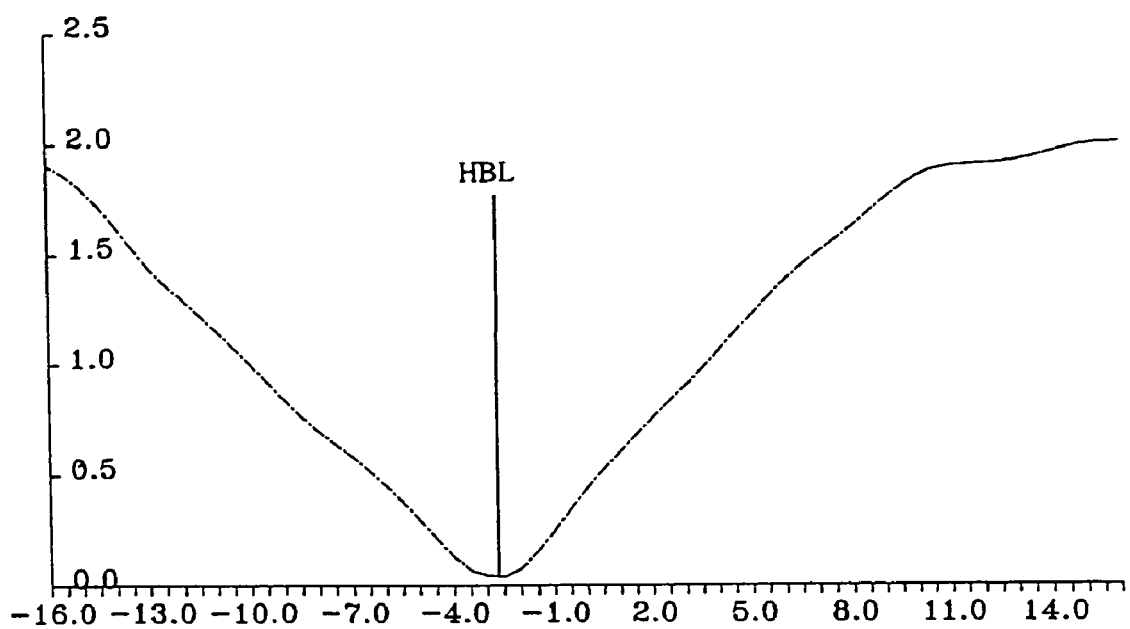
FIG. 1 is a graph showing the front surface of the double progressive spectacle lens with a surface astigmatism in the position of use, in horizontal section at y=−13 mm.

As can be seen from FIG. 1, in the position of use, a curve of astigmatism that is approximately symmetrical in relation to the principal line of sight is yielded in the horizontal sections. In this example, the principal line of sight is at x=−2.7 mm in the coordinate system of the front surface.

Figure 2:
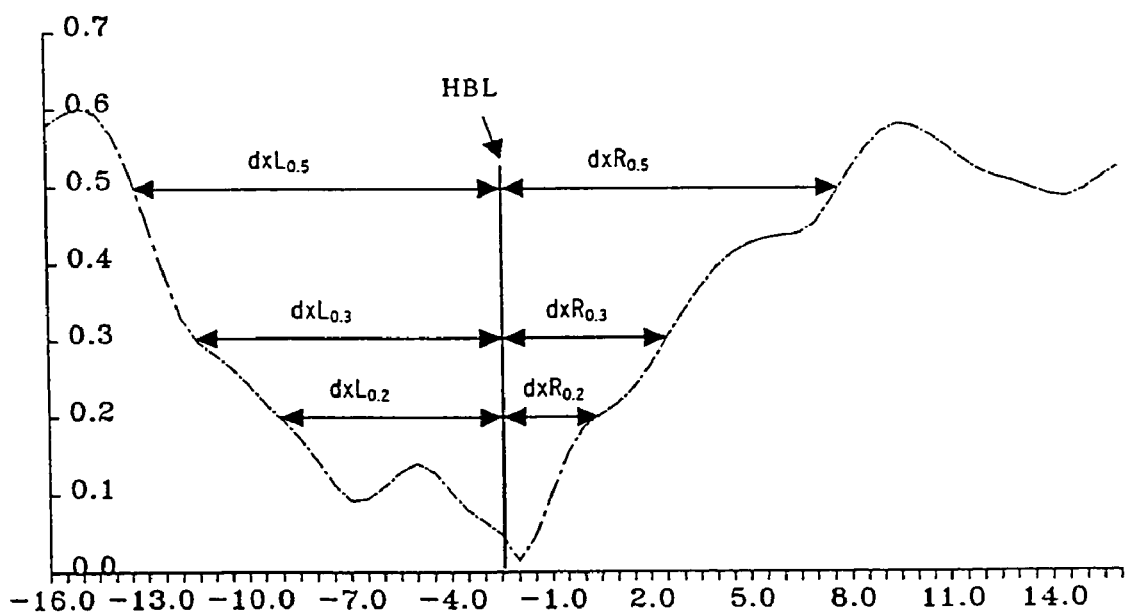
FIG. 2 is a graph showing the rear surface of the double progressive spectacle lens with a surface astigmatism in the position of use, in horizontal section at y=−13 mm.
Figure 3A:
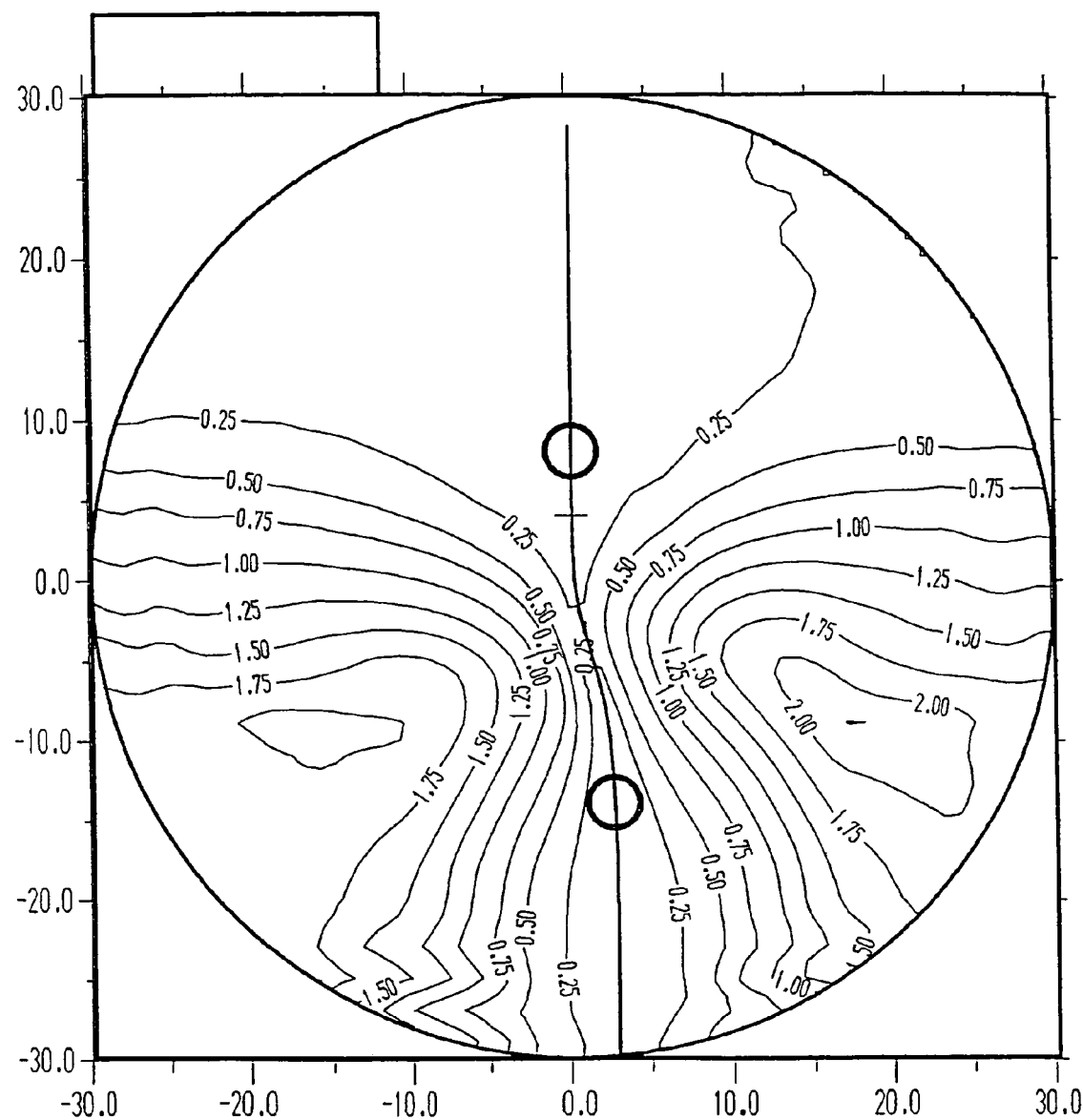
FIGS. 3a and 3b are diagrams showing an illustrative embodiment of an asymmetric rear surface that has been added to a given front surface.
Figure 3B:
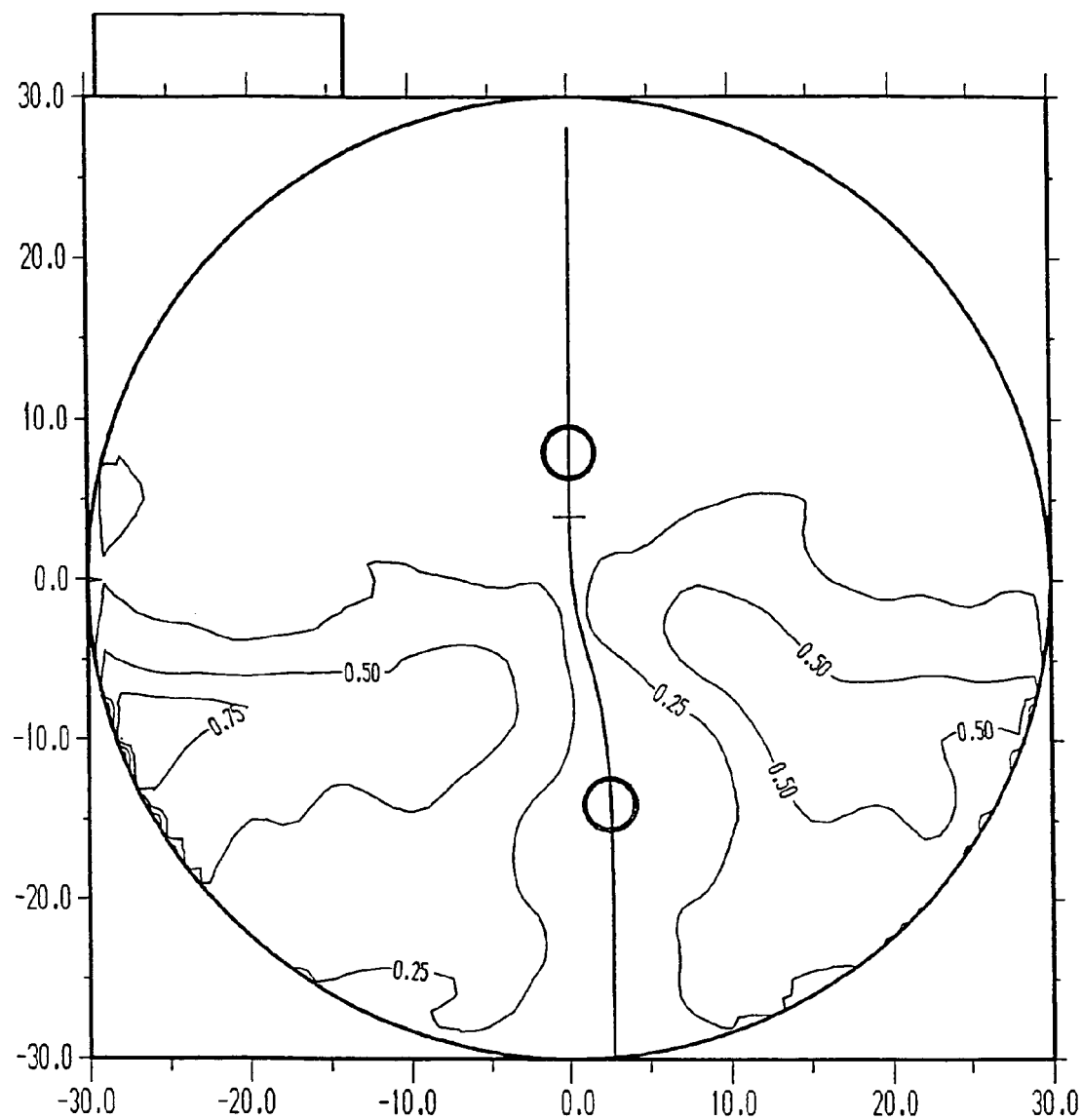
Figure 4A:
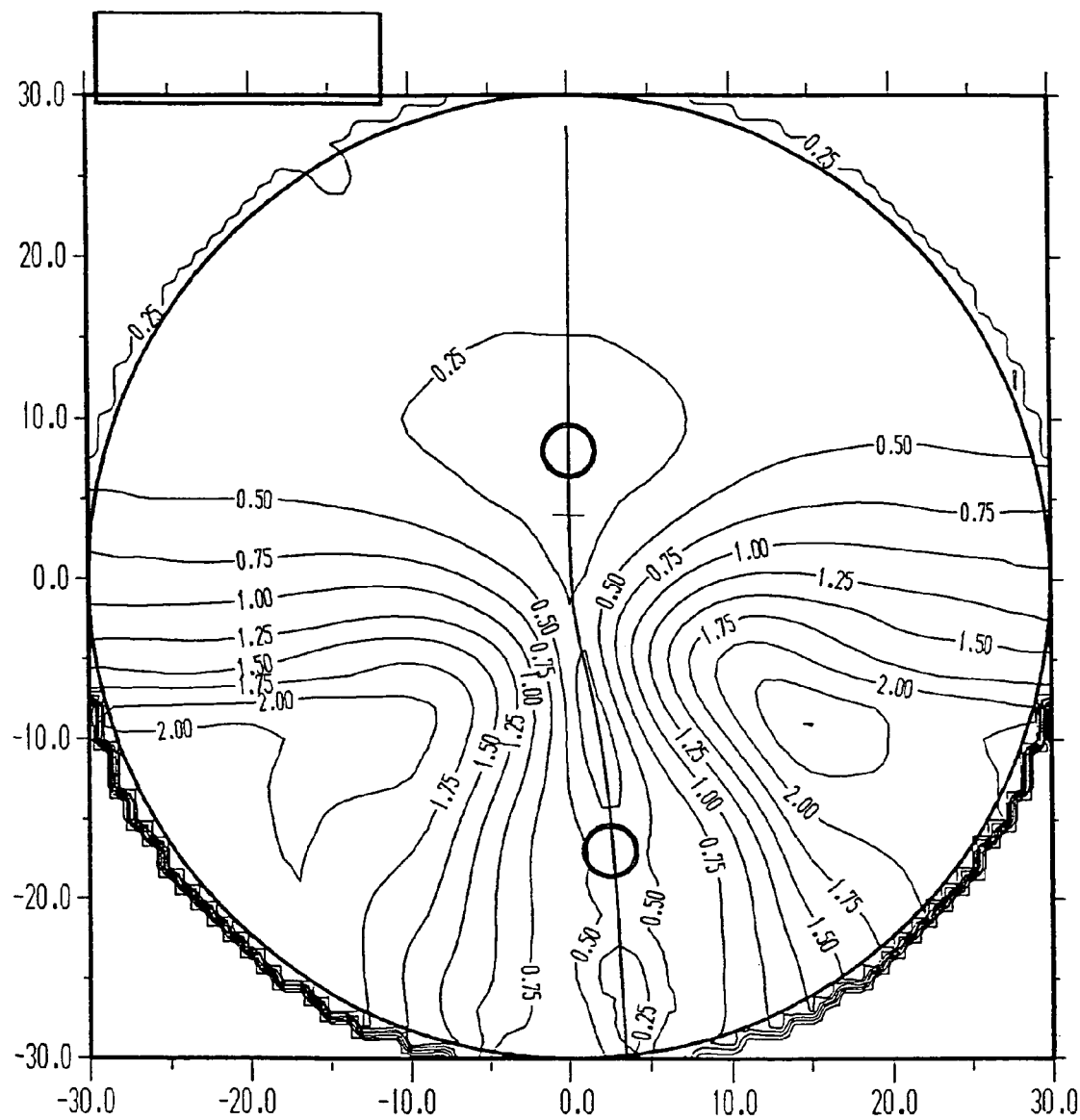
FIGS. 4a and 4b are diagrams showing an illustrative embodiment of an asymmetric front surface that has been added to a given rear surface.
Figure 4B:
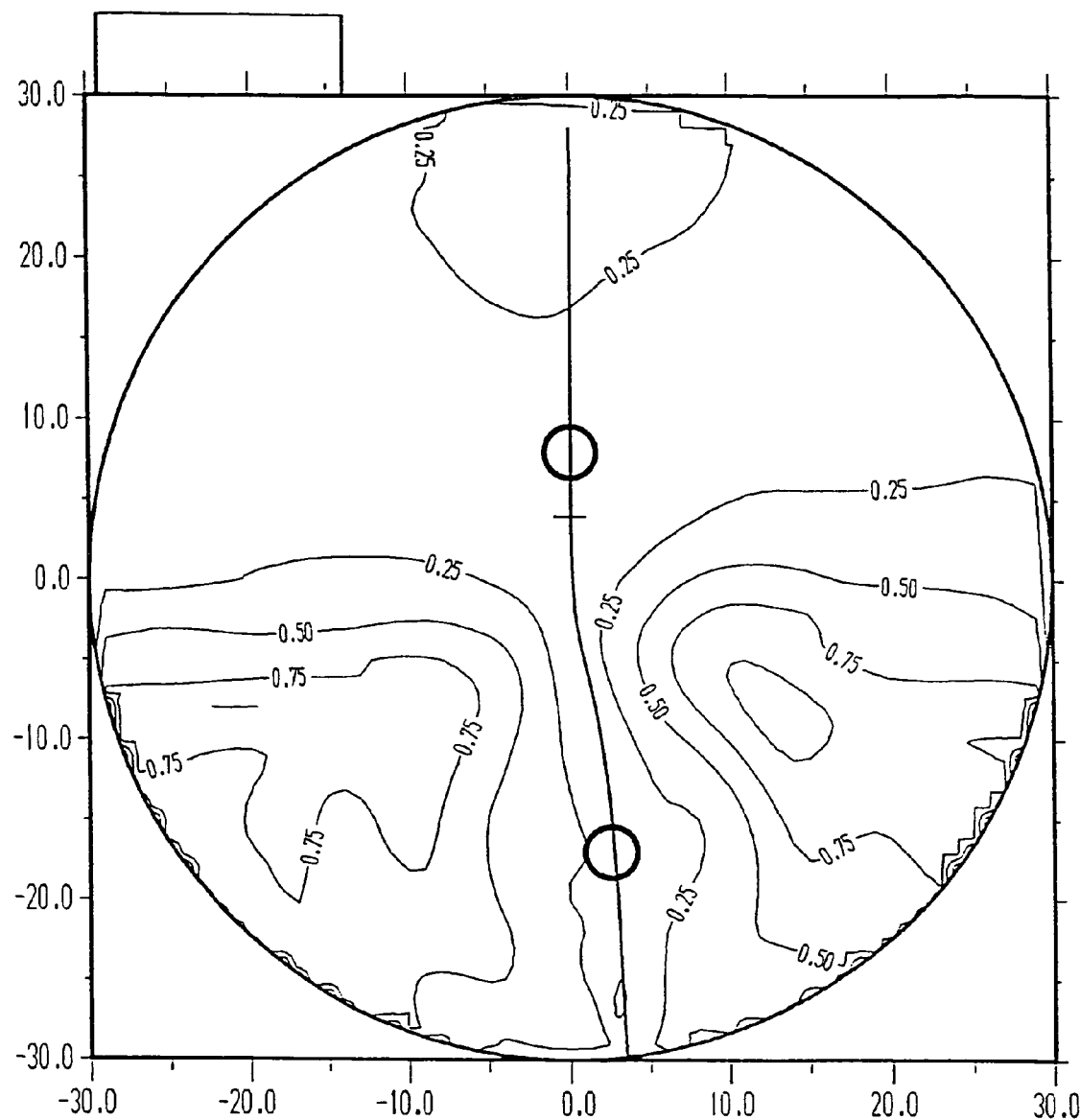

This symmetrical behavior in the position of use is typical of progressive lenses. FIG. 2 shows the rear surface of the double progressive spectacle lens with a surface astigmatism in the position of use in the horizontal section at y=−13 mm. The principal line of sight is the vertical line, which is marked by HBL. It is situated on the rear surface at x=−2.5 mm. The distances $dxL_A$ and $dxR_A$ are depicted for A=0.5, 0.3 and 0.2 dpt. The nasal side is located on the left in this illustration. As emerges from FIG. 2, the rear surface has completely lost the symmetry in the surroundings of the principal line of sight. The principal line of sight is situated at x=−2.5 mm in the coordinate system of the rear surface, which is approximately 0.5 mm to the left of the global minimum. A very similar asymmetric image results when, instead of the rear surface being adapted to a given front surface, the front surface is adapted to a given rear surface.

In the case of the exemplary surface, on the 0.2 dpt level, the left-hand distance $dxL_{0.2}=6.5$ mm and the right-hand distance $dxR_{0.2}=3.0$ mm. This yields a symmetry factor of $S_{0.2}=0.46$.

On the 0.3 dpt level, the left-hand distance $dxL_{0.3}=9.0$ mm and the right-hand distance $dxR_{0.3}=5.1$ mm. The symmetry factor thereby yielded is $S_{0.3}=0.57$.

On the 0.5 dpt level the left-hand distance $dxL_{0.5}=10.9$ mm and the right-hand distance $dxR_{0.5}=10.2$ mm. The symmetry factor thereby yielded is $S_{0.5}=0.94$.

This shows that the described asymmetry is a property of the close surroundings of the principal line and decreases outwards, that is to say with a rising level of astigmatism. The shorter distances in FIG. 2 are all located to the right of the principal line of sight. They would all be located on the left in a lens reflected at a vertical axis, but the symmetry factor would be the same. The symmetry factor is therefore a measure of the (a) symmetry of a surface that is independent of coordinate systems and reflection operations about vertically running axes.

FIGS. 3a and 3b and FIGS. 4a and 4b show illustrative embodiments of an asymmetric rear surface and front surface, respectively, which have been added to a prefabricated front surface and rear surface, respectively. The marked deviation from horizontal symmetry in the inner near zone is clearly to be seen from FIGS. 3b and 4b.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A double progressive spectacle lens having a prefabricated progressive surface and a second progressive surface for correcting a spherical ametropia or a cylindrical ametropia, wherein one of the progressive surfaces is formed on the front surface of the lens and the other progressive surface is formed on the rear surface of the lens; the surface properties of the second progressive surface in the vicinity of the principal line of sight are asymmetric; the asymmetry is determined by the symmetry factor $S_A$; the symmetry factor $S_A$ is determined in relation to the value A by the ratio of the smaller to the larger horizontal distance between the principal line of sight and locations on both sides of the principal line of sight at which the surface astigmatism in a horizontal section reaches the value A in diopters, and the symmetry factor $S_{0.3}$ of the second progressive surface is smaller than 0.8 in at least one horizontal section.

2. A double progressive spectacle lens according to claim 1, wherein in order to correct an astigmatism of the eye with an axial position of 0°±5° or 90°±5°, the symmetry factor $S_{0.3}$ of the second progressive surface is smaller than 0.8 in at least one horizontal section.

3. A double progressive spectacle lens according to claim 1, wherein the surface astigmatism in the horizontal section passes through a first minimum in the case of the second progressive surface within a region between 2 mm to the right and 2 mm to the left of the principal line of sight.

4. A double progressive spectacle lens according to claim 1, wherein the surface astigmatism in the horizontal section passes through a minimum in the case of the second progressive surface within a region between 1 mm to the right and 1 mm to the left of the principal line of sight.

5. A double progressive spectacle lens according to claim 3, wherein the surface astigmatism in the horizontal section passes through a second minimum, differing from the first minimum, in the case of the second progressive surface in a region of 6 mm to the right and left of the principal line of sight.

6. A double progressive spectacle lens according to claim 1, wherein in a region between y=+30 mm and y=−30 mm:
the symmetry factor $S_{0.8}$ of the second progressive surface is smaller than 0.8 in at least one horizontal section;
the symmetry factor $S_{0.2}$ of the second progressive surface is smaller than 0.7 in at least one horizontal section;
the surface astigmatism in the horizontal section passes through a first minimum in the case of the second progressive surface in a region between 2 mm to the right and 2 mm to the left of the principal line of sight, and
the surface astigmatism in the horizontal section passes through a further minimum, differing from the first minimum, in the case of the second progressive surface in a region of 6 mm to the right and left of the principal line of sight.

7. A double progressive spectacle lens according to claim 6, wherein:
the symmetry factor $S_{0.2}$ of the second progressive surface is smaller than 0.5 in at least one horizontal section, and
the surface astigmatism in the horizontal section passes through said first minimum in the case of the second progressive surface in a region of between 1 mm to the right and 1 mm to the left of the principal line of sight.

8. A double progressive spectacle lens according to claim 1, wherein in a region between y=+20 mm and y=−20 mm:
the symmetry factor $S_{0.3}$ of the second progressive surface is smaller than 0.8 in at least one horizontal section;
the symmetry factor $S_{0.2}$ of the second progressive surface is smaller than 0.7 in at least one horizontal section;
the surface astigmatism in the horizontal section passes through a first minimum in the case of the second progressive surface in a region between 2 mm to the right and 2 mm to the left of the principal line of sight, and
the surface astigmatism in the horizontal section passes through a further minimum, differing from the first minimum, in the case of the second progressive surface in a region of 6 mm to the right and left of the principal line of sight.

9. A double progressive spectacle lens according to claim 8, wherein:
the symmetry factor S0.2 of the second progressive surface is smaller than 0.5 in at least one horizontal section, and
the surface astigmatism in the horizontal, section passes through said first minimum in the case of the second progressive surface in a region between 1 mm to the right and 1 mm to the left of the principal line of sight.

10. A double progressive spectacle lens according to claim 1, wherein the second progressive surface is the rear side of the double progressive spectacle lens.

11. A double progressive spectacle lens according to claim 1, wherein the second progressive surface is the front side of the double progressive spectacle lens.

12. A double progressive spectacle lens according to claim 1, wherein the horizontal component of the gradient of the surface astigmatism of the second progressive surface has a value other than zero at the principal line of sight.

13. A double progressive spectacle lens having a prefabricated progressive surface and a second progressive surface for correcting a spherical ametropia or a cylindrical ametropia, wherein one of the progressive surfaces is formed on the front surface of the lens and the other progressive surface is formed on the rear surface of the lens; the surface properties of the second progressive surface in the vicinity of the principal line of sight are asymmetric; the asymmetry is determined by the symmetry factor $S_A$; the symmetry factor $S_A$ is determined in relation to the value A by the ratio of the smaller to the larger horizontal distance between the principal line of sight and locations on both sides of the principal line of sight at which the surface astigmatism in a horizontal section reaches the value A in diopters, and the symmetry factor $S_{0.2}$ of the second progressive surface is smaller than 0.7 in at least one horizontal section.

14. A double progressive spectacle lens according to claim 13, wherein the symmetry factor $S_{0.2}$ of the second progressive surface is smaller than 0.5 in at least one horizontal section.

15. A double progressive spectacle lens having a prefabricated progressive surface and a second progressive surface for correcting a spherical ametropia or a cylindrical ametropia, wherein the surface properties of the second progressive surface in the vicinity of the principle line of sight are asymmetric; the asymmetry is determined by the symmetry factor $S_A$; the symmetry factor $S_A$ is determined in relation to the value A by the ratio of the smaller to the larger horizontal distance between the principal line of sight and locations on both sides of the principal line of sight at which the surface astigmatism in a horizontal section reaches the value A in diopter, and the surface power $$D=0.5*(n-n')(1/r_1+1/r_2)$$

decreases from top to bottom along the principal line of sight.

16. A method for producing a double progressive spectacle lens, comprising the steps of:
   selecting a prefabricated progressive surface from an existing base curve system,
   calculating a second progressive surface having surface properties in the vicinity of the principal line of sight which are asymmetric; the asymmetry being determined by the symmetry factor $S_A$; the symmetry factor $S_A$ being determined in relation to the value A by the ratio of the smaller to the larger horizontal distance between the principal line of sight and locations on both sides of the principal line of sight at which the surface astigmatism in a horizontal section reaches the value A in diopters, and the symmetry factor $S_{0.3}$ of the second progressive surface being smaller than 0.8 in at least one horizontal section, and
   fabricating the double progressive spectacle lens.

17. A method for producing a double progressive spectacle lens, comprising the steps of:
   selecting a prefabricated progressive surface from an existing base curve system,
   calculating a second progressive surface having surface properties in the vicinity of the principal line of sight which are asymmetric; the asymmetry being determined by the symmetry factor $S_A$; the symmetry factor $S_A$ being determined in relation to the value A by the ratio of the smaller to the larger horizontal distance between the principal line of sight and locations on both sides of the principal line of sight at which the surface astigmatism in a horizontal section reaches the value A in diopters, and the symmetry factor $S_{0.2}$ of the second progressive surface being smaller than 0.7 in at least one horizontal section, and
   fabricating the double progressive spectacle lens.

18. A method for producing a double progressive spectacle lens, comprising the steps of:
   selecting a prefabricated progressive surface from an existing base curve system,
   calculating a second progressive surface having surface properties in the vicinity of the principal line of sight which are asymmetric; the asymmetry being determined by the symmetry factor $S_A$; the symmetry factor $S_A$ being determined in relation to the value A by the ratio of the smaller to the larger horizontal distance between the principal line of sight and locations on both sides of the principal line of sight at which the surface astigmatism in a horizontal section reaches the value A in diopters, and the surface power $$D=0.5*(n-n')(1/r_1+1/r_2)$$

decreasing from top to bottom along the principal line of sight, and
   fabricating the double progressive spectacle lens.

* * * * *